United States Patent
Yamazaki et al.

(10) Patent No.: US 10,845,783 B2
(45) Date of Patent: Nov. 24, 2020

(54) COMPONENT MOUNTING SYSTEM, WORKER ALLOCATION SYSTEM, AND WORKER ALLOCATION METHOD

(71) Applicant: Panasonic Intellectual Property Management Co., Ltd., Osaka (JP)

(72) Inventors: Takuya Yamazaki, Fukuoka (JP); Hirokazu Takehara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 95 days.

(21) Appl. No.: 15/814,898

(22) Filed: Nov. 16, 2017

(65) Prior Publication Data

US 2018/0150065 A1 May 31, 2018

(30) Foreign Application Priority Data

Nov. 30, 2016 (JP) .................. 2016-232596

(51) Int. Cl.
  *G06Q 10/06* (2012.01)
  *G05B 19/418* (2006.01)
  *G06F 9/50* (2006.01)

(52) U.S. Cl.
  CPC . *G05B 19/41805* (2013.01); *G05B 19/41865* (2013.01); *G06F 9/505* (2013.01); *G06F 9/5038* (2013.01); *G06F 9/5066* (2013.01); *G06Q 10/06* (2013.01); *G05B 2219/32258* (2013.01); *G05B 2219/32297* (2013.01); *Y02P 90/20* (2015.11)

(58) Field of Classification Search
  CPC ........ G05B 19/41805; G05B 19/41865; G05B 2219/32258; G05B 2219/32297; G06F 9/5066; G06Q 10/06; Y02P 90/20; Y02P 90/30; Y02P 90/04
  USPC .......................................................... 700/9
  See application file for complete search history.

(56) References Cited

U.S. PATENT DOCUMENTS

| 8,548,838 | B1* | 10/2013 | Ganesan | G06Q 10/06311 |
| | | | | 705/7.13 |
| 2005/0119983 | A1* | 6/2005 | Bonabeau | G06N 3/126 |
| | | | | 706/46 |
| 2005/0228533 | A1* | 10/2005 | Hioki | G05B 19/4103 |
| | | | | 700/159 |
| 2007/0067201 | A1* | 3/2007 | Malewicz | G06Q 10/06 |
| | | | | 705/7.17 |
| 2007/0288287 | A1* | 12/2007 | Hayler | G06Q 10/00 |
| | | | | 705/7.14 |
| 2009/0204470 | A1* | 8/2009 | Weyl | G06Q 10/06311 |
| | | | | 705/7.13 |

(Continued)

FOREIGN PATENT DOCUMENTS

| JP | 2002-373015 A | 12/2002 |
| JP | 2004-363312 A | 12/2004 |

(Continued)

*Primary Examiner* — Rocio Del Mar Perez-Velez
*Assistant Examiner* — Alicia M. Choi
(74) *Attorney, Agent, or Firm* — Pearne & Gordon LLP (57) ABSTRACT

A component mounting system includes a plurality of component mounting lines, and in the production of predetermined mounting boards, determines an allocation of workers to work which arises in each of the plurality of component mounting lines such that production completion times of the plurality of component mounting lines become sooner.

3 Claims, 7 Drawing Sheets

(56) References Cited

U.S. PATENT DOCUMENTS

| | | | | |
|---|---|---|---|---|
| 2011/0208556 A1* | 8/2011 | Nagahara | ............... | G06Q 10/06 705/7.14 |
| 2014/0071481 A1* | 3/2014 | Gross | .................... | G06F 3/1212 358/1.15 |
| 2014/0303767 A1* | 10/2014 | Klumpp | ........... | G05B 19/41845 700/105 |
| 2015/0134386 A1* | 5/2015 | Jogalekar | ......... | G06Q 10/06311 705/7.13 |
| 2016/0011902 A1* | 1/2016 | Agarwal | .................... | G06F 9/46 718/102 |
| 2016/0196520 A1* | 7/2016 | Yamashita | ............. | G06Q 50/04 705/7.13 |
| 2017/0061365 A1 | 3/2017 | Nonoyama | | |
| 2019/0049935 A1* | 2/2019 | Ikeda | ................ | G05B 19/41805 |
| 2019/0056701 A1* | 2/2019 | Ikeda | ................. | G05B 13/0255 |

FOREIGN PATENT DOCUMENTS

| | | |
|---|---|---|
| JP | 2005-025539 A | 1/2005 |
| JP | 2012-028660 A | 2/2012 |
| WO | 2015/166538 A1 | 11/2015 |

\* cited by examiner

COMPONENT MOUNTING SYSTEM, WORKER ALLOCATION SYSTEM, AND WORKER ALLOCATION METHOD

BACKGROUND

1. Technical Field

The present disclosure relates to a component mounting system, a worker allocation system, and a worker allocation method which determine an allocation of workers with respect to a plurality of component mounting lines.

2. Description of the Related Art

In a component mounting system which is provided with a plurality of component mounting lines, each of which is configured by connecting a plurality of devices for component mounting such as component mounters which mount components on boards, mounting boards of various board types are produced in parallel at the same time in each component mounting line. When switching the board type to be produced in the component mounting line, so-called setup changing work (device type switching work) such as exchanging a feeder (a tape feeder or the like) which is installed in the component mounter and supplies components for a new board type is performed by a plurality of workers.

A system which determines the allocation of workers such that the total work time of the setup changing work by the workers is shortened is proposed with the object of rendering the setup changing work more efficient (for example, refer to Japanese Patent Unexamined Publication No. 2005-25539). A system which calculates which device for which to next perform the setup changing work preferentially enables work to be carried out efficiently and indicates a preferential order of the setup changing work is proposed (for example, refer to Japanese Patent Unexamined Publication No. 2002-373015).

In the related art which includes Japanese Patent Unexamined Publication No. 2005-25539 and Japanese Patent Unexamined Publication No. 2002-373015, the total work time of the setup changing work of the workers is shortened, individual items of the setup changing work are rendered efficient, and the like, but on the floor level at which the mounting boards are produced in parallel at the same time by a plurality of component mounting lines, there is a problem in that the production time of the mounting boards which includes the work time which is necessary for the setup changing work is not necessarily shortened and further improvements are necessary.

SUMMARY

A component mounting system of the present disclosure is a component mounting system which includes a plurality of component mounting lines and is provided with a worker allocation determination unit which determines an allocation of workers to work which arises in each of the plurality of component mounting lines such that production completion times of the plurality of component mounting lines become sooner when producing predetermined mounting boards, and a management storage which stores the allocation of workers which is determined by the worker allocation determination unit.

A worker allocation system of the present disclosure is provided with a worker allocation determination unit which determines an allocation of workers to work which arises in each of a plurality of component mounting lines such that production completion times of the plurality of component mounting lines become sooner when producing predetermined mounting boards, and a management storage which stores the allocation of workers which is determined by the worker allocation determination unit.

A worker allocation method of the present disclosure is provided with a worker allocation step of determining an allocation of workers to work which arises in each of a plurality of component mounting lines such that production completion times of the plurality of component mounting lines become sooner when producing predetermined mounting boards, and a storage step of storing the allocation of workers which is determined in the worker allocation determination unit.

According to the present disclosure, it is possible to determine the allocation of the workers such that it is possible to efficiently produce the mounting boards in the plurality of component mounting lines.

DETAILED DESCRIPTION

The present disclosure describes a component mounting system, a worker allocation system, and a worker allocation method which are capable of determining an allocation of workers such that it is possible to efficiently produce mounting boards in a plurality of component mounting lines.

Figure 3:
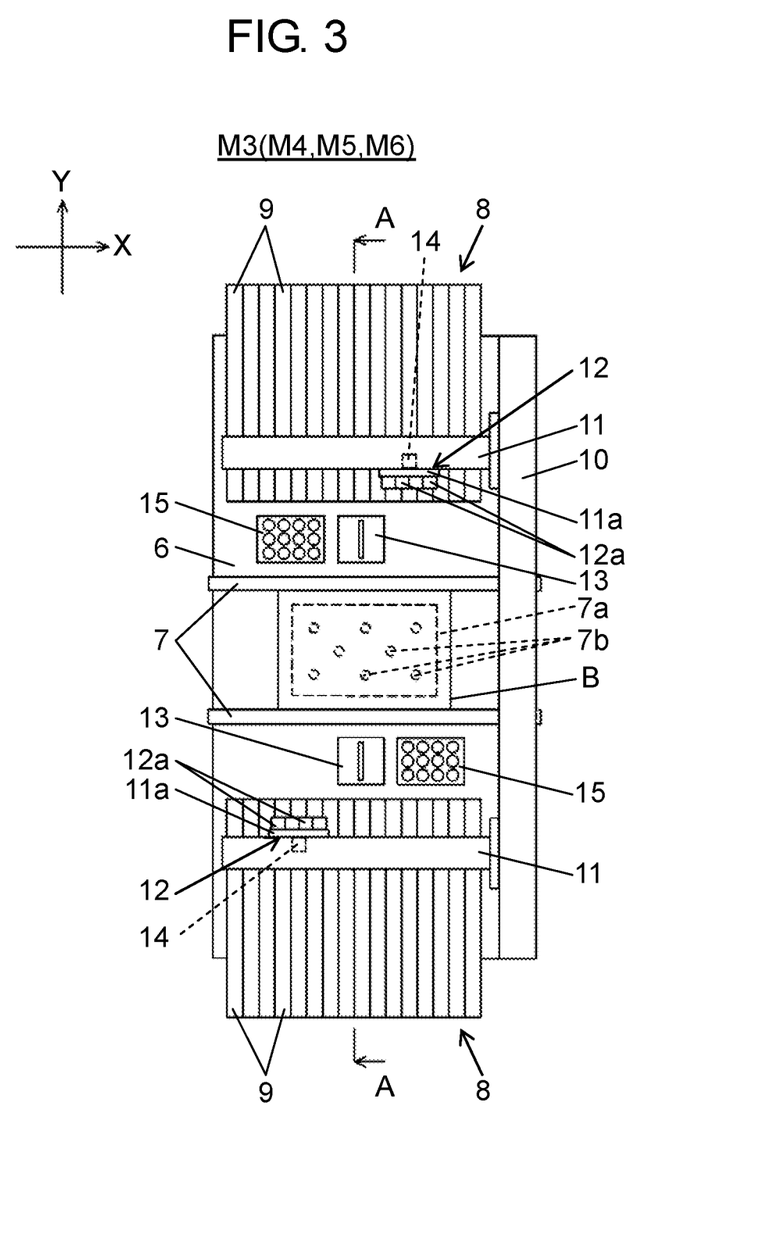
FIG. 3 is a plan view of a component mounter with which the component mounting system of an embodiment of the present disclosure is provided.
Figure 4:
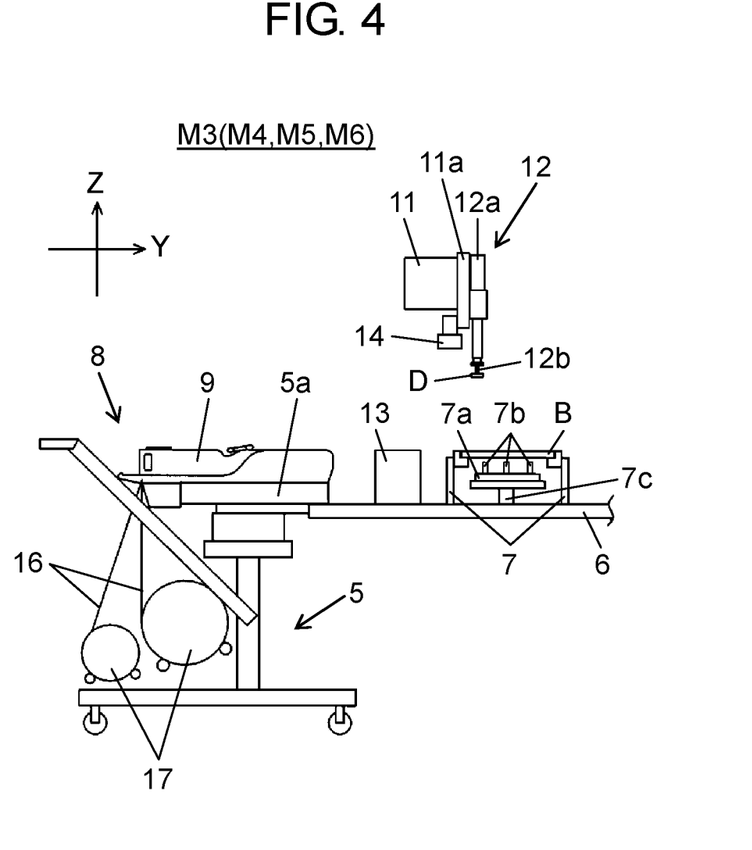
FIG. 4 is a partial sectional diagram of the component mounter with which the component mounting system of an embodiment of the present disclosure is provided.

Hereinafter, a detailed description will be given of an embodiment of the present disclosure using the drawings. The configurations, forms, and the like which are described hereinafter are examples to facilitate explanation, and may be modified, as appropriate, according to the design of the component mounting system, the component mounting line, and the component mounter. Hereinafter, elements corresponding to each other are given the same symbols in all of the drawings, and duplicated description is omitted. In FIG. 3 and some parts described later, an X direction (the left-right direction in FIG. 3) in the board transport direction and a Y direction (the up-down direction in FIG. 3) perpendicular to the board transport direction are illustrated as two axial directions which orthogonally intersect each other in a horizontal plane. In FIG. 4, a Z direction (an up-down direction in FIG. 4) is illustrated as a height direction perpendicular to the horizontal plane. The Z direction is the up-down direction or a perpendicular direction in a case in which the component mounter is installed on the horizontal plane.

Figure 1:
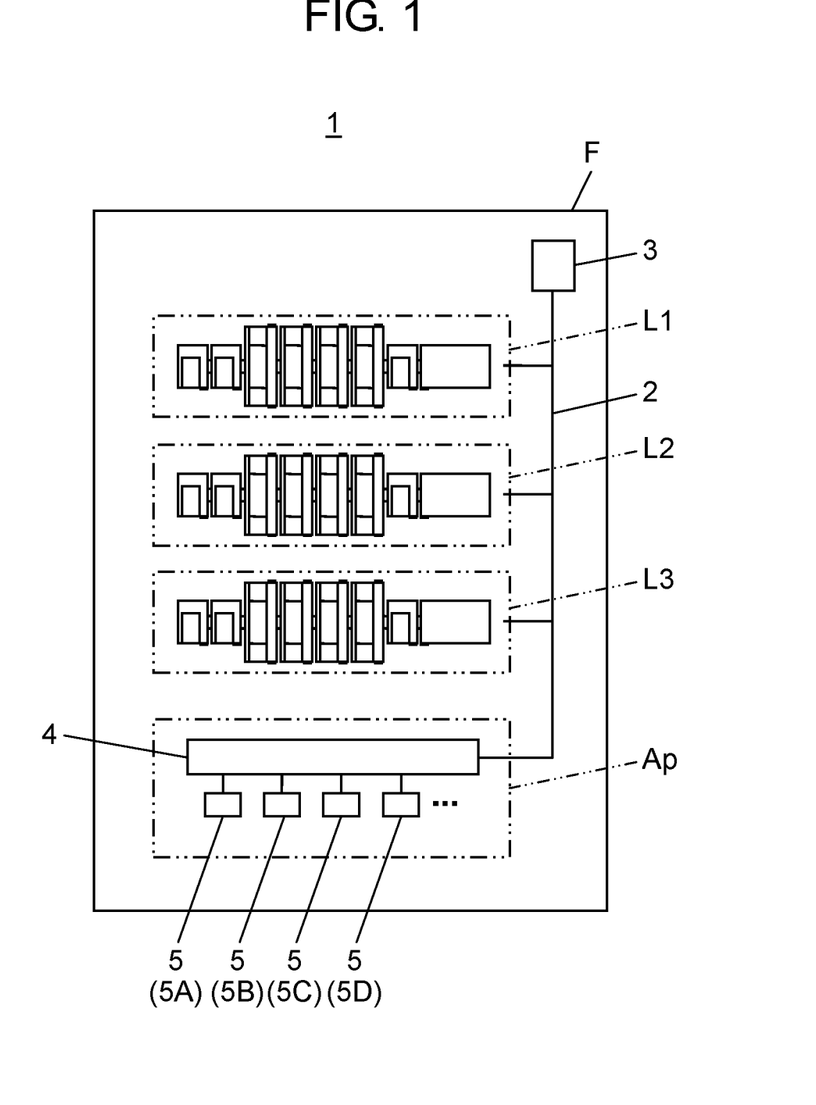
FIG. 1 is an explanatory diagram of the configuration of a component mounting system of an embodiment of the present disclosure.

First, a description will be given of the configuration of component mounting system 1 with reference to FIG. 1. Component mounting system 1 is configured such that three component mounting lines L1 to L3 which are arranged on floor F are connected by communication network 2 and are managed by management computer 3. As described later, each of component mounting lines L1 to L3 is configured by connecting a plurality of devices for component mounting including a component mounter and has a function of producing mounting boards in which components are mounted on boards. In other words, component mounting system 1 includes the plurality of component mounting lines L1 to L3, each of which is configured by connecting a plurality of devices for component mounting. It is not necessary for the number of component mounting lines L1 with which component mounting system 1 is provided to be three, and the number may be two or greater than or equal to four.

Setup work support device 4 is arranged in external setup area Ap which is provided in floor F. Setup work support device 4 is connected to management computer 3 via communication network 2. A plurality of component supply carriages 5 (here, four component supply carriages 5A, 5B, 5C, and 5D) for exchanging which serve as targets of the setup work are connected to setup work support device 4.

A plurality of tape feeders which supply components are installed in each of component supply carriages 5 which are connected to setup work support device 4 by a worker in charge of the setup work. When tape feeders 9 (refer to FIG. 3) are installed in each component supply carriage 5 which is connected to setup work support device 4, power is supplied to tape feeders 9 by setup work support device 4 via each component supply carriage 5 and a feeder controller (not illustrated) which is embedded in each tape feeder 9 enters a state of being capable of communicating with management computer 3. Accordingly, in management computer 3, it is possible to acquire the status of the setup work such as the installation status of tape feeders 9 of each component supply carriage 5 and the replenishing status to the tape feeder 9 of each carrier tape 16 (refer to FIG. 4) which holds components to be installed in each corresponding tape feeder 9.

In this manner, in each component supply carriage 5 which is connected to setup work support device 4, it is possible to perform the setup work without being influenced by the production status of the mounting boards in component mounting lines L1 to L3. In other words, setup work support device 4 supports the setup work (hereinafter referred to as "external setup work") without stopping the production of the mounting boards in component mounting lines L1 to L3. Each component supply carriage 5 for exchanging in which the external setup work is completed is exchanged with component supply carriage 5 which is installed in a component mounter and is an exchanging target in the setup work (hereinafter referred to as "internal setup work") which is carried out after stopping the production of the mounting boards in component mounting lines L1 to L3.

Figure 2:
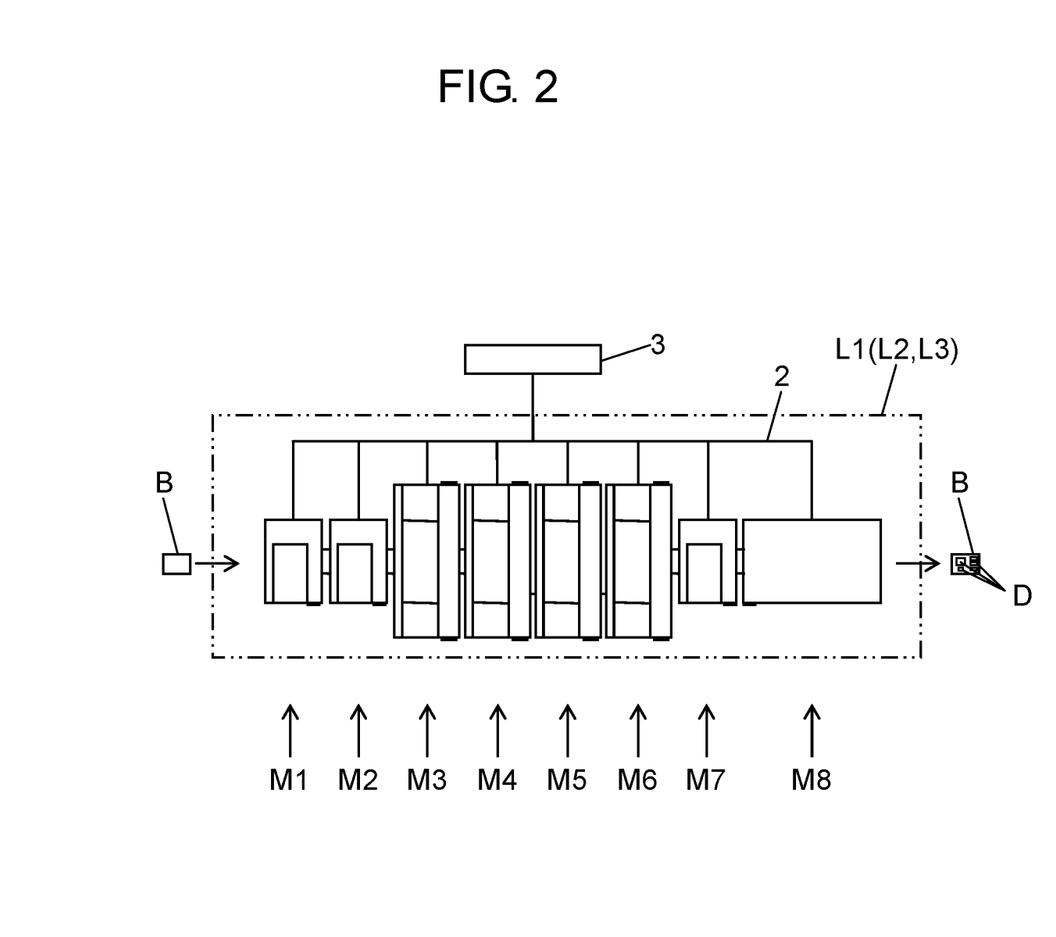
FIG. 2 is an explanatory diagram of the configuration of a component mounting line with which the component mounting system of an embodiment of the present disclosure is provided.

Next, a description will be given of the detailed configuration of component mounting lines L1 to L3 with reference to FIG. 2. Component mounting lines L1 to L3 have the same configuration and hereinafter, a description will be given relating to component mounting line L1. Component mounting line L1 is configured by connecting, in series from an upstream side (a paper surface left side) in the board transport direction toward a downstream side (a paper surface right side), devices for component mounting such as solder printer M1, print inspector M2, component mounters M3 to M6, mounting inspector M7, and reflow device M8.

Solder printer M1, print inspector M2, component mounters M3 to M6, mounting inspector M7, and reflow device M8 are connected to management computer 3 via communication network 2. Solder printer M1 performs solder printing work in which a solder printing work unit is used to print solder via a mask onto board B which is carried in from the upstream side. Print inspector M2 performs print inspection work in which a print inspection working unit including a solder inspection camera is used to inspect the state of the solder which is printed on board B.

Component mounters M3 to M6 perform component mounting work in which a component mounting work unit is used to mount components D onto board B. Component mounting line L1 is not limited to a configuration in which there are four of component mounters M3 to M6, and the number of component mounters M3 to M6 may be one to three or greater than or equal to five. Mounting inspector M7 performs mounting inspection work in which a mounting inspection work unit including a component inspection camera is used to inspect the state of components D which are mounted on board B. Reflow device M8 performs board heating work in which a board heater is used to heat board B which is carried into the device, the solder on board B is cured, and electrode portions of board B and components D are bonded.

Next, a description will be given of the configuration of component mounters M3 to M6 with reference to FIGS. 3 and 4. Component mounters M3 to M6 have the same configuration, and here, description will be given of component mounter M3. FIG. 4 partially illustrates the cross section taken along line A-A in FIG. 3. Component mounter M3 has a function of mounting components D onto board B.

In FIG. 3, board transport mechanism 7 is arranged in the X direction at the center of table 6. Board transport mechanism 7 transports board B which is carried in from the upstream side and positions board B at a position for performing the component mounting work. Bottom receiving pin holding plate 7a in which bottom receiving pins 7b are installed on the top surface of bottom receiving pin holding plate 7a is positioned under board B which is positioned in board transport mechanism 7. Bottom receiving pins 7b abut the bottom surface of board B to hold board B from the bottom surface by lifting bottom receiving pin holding plate 7a using bottom receiving pin lifting and lowering driver 7c (refer to FIG. 4). Bottom receiving pin holding plate 7a has a structure which freely attaches and detaches with respect to bottom receiving pin lifting and lowering driver 7c and bottom receiving pins 7b are configured to freely attach and detach with respect to bottom receiving pin holding plate 7a.

Bottom receiving pins 7b are disposed as appropriate according to board B (the mounting board to be produced) onto which components D are mounted by preparation work of bottom receiving pins 7b by the worker. For the preparation work of bottom receiving pins 7b, in the internal setup work, it is possible to change the disposition of bottom receiving pins 7b in a state in which bottom receiving pin holding plates 7a are installed in component mounters M3 to M6. For the preparation work of bottom receiving pins 7b, in the external setup work, the disposition of bottom receiving pins 7b for the next mounting board with respect to a space bottom receiving pin holding plate 7a which is removed from the corresponding component mounter M3 to M6 is performed, and in the internal setup work, it is possible to exchange bottom receiving pin holding plate 7a for which the disposition is completed for bottom receiving pin holding plate 7a which is installed in the corresponding component mounter M3 to M6.

Component supplier 8 is disposed on each side of board transport mechanism 7. A plurality of tape feeders 9 is disposed on each component supplier 8 such that tape feeders 9 line up in the X direction. Tape feeders 9 supply components D to component pick-up positions of a mounting head of a component mounting mechanism (described later) by pitch feeding carrier tapes which store components D in a tape feed direction.

Y-axis beam 10 which is provided with a linear drive mechanism is arranged along the Y direction on the end portion of one side in the X direction on the top surface of table 6. Two X-axis beams 11 which are similarly provided with a linear drive mechanism are joined to Y-axis beam 10 to move freely in the Y direction. X-axis beams 11 are arranged along the X direction. Mounting head 12 is installed on each of two X-axis beams 11 to move freely in the X direction. As illustrated in FIG. 4, mounting head 12 is provided with a plurality of suction units 12a which are capable of sucking components D to hold, lift, and lower components D. Suction nozzle 12b is provided on the tip of each suction unit 12a.

In FIG. 3, each mounting head 12 moves in the X direction and the Y direction due to Y-axis beam 10 and the corresponding X-axis beam 11 being driven. Accordingly, using suction nozzles 12b, two mounting heads 12 suck and pick up components D from the component pick-up positions of tape feeders 9 which are disposed on component suppliers 8 corresponding to each mounting head 12 and mount components D onto mounting points on board B which is positioned in board transport mechanism 7. Y-axis beam 10, X-axis beams 11, and mounting heads 12 configure the component mounting mechanism which mounts components D onto board B by moving mounting heads 12 which hold components D.

Each component recognition camera 13 is arranged between a corresponding pair of component supplier 8 and board transport mechanism 7. When mounting heads 12 which pick up components D from component suppliers 8 move above component recognition cameras 13, component recognition cameras 13 image components D in the state of being held by mounting heads 12 and recognize the holding orientations of components D. Each board recognition camera 14 is attached to plate 11a to which the corresponding mounting head 12 is attached. Each board recognition camera 14 moves integrally with the corresponding mounting head 12.

Due to the movement of mounting heads 12, board recognition cameras 14 move above board B which is positioned in board transport mechanism 7 and board recognition cameras 14 image board marks (not illustrated) which are provided on board B to recognize the position of board B. In a component mounting operation of board B carried out by each mounting head 12, mounting position correction is performed, taking into account the recognition results of component D by component recognition camera 13 and the recognition results of the board position by board recognition camera 14.

In FIG. 3, each nozzle holder 15 is arranged in a freely attachable and detachable manner between a corresponding pair of component supplier 8 and board transport mechanism 7. A plurality of suction nozzles 12b to be installed in each mounting head 12 is stored and held in the corresponding nozzle holder 15 to correspond to the component types. It is possible to exchange suction nozzle 12b which is installed in suction unit 12a according to the component type by to the corresponding mounting head 12 accessing the corresponding nozzle holder 15 to perform a nozzle exchanging operation.

In FIG. 4, each component supplier 8 is configured by component supply carriage 5 in which a plurality of tape feeders 9 are installed on a feeder base 5a in advance. Each component supply carriage 5 is configured to freely attach and detach with respect to table 6. Due to tape feeders 9 being installed on feeder base 5a, a feeder controller which is embedded in each tape feeder 9 is electrically connected to mounting controller 21 (refer to FIG. 5) of the corresponding component mounter M3 to M6. Supply reel 17 which stores carrier tape 16 in a wound state is held in each component supply carriage 5. Carrier tape 16 which is pulled out from each supply reel 17 is installed in the corresponding tape feeder 9. Tape feeders 9 pitch feed carrier tapes 16 to the component pick-up positions of suction nozzles 12b.

In this manner, in component mounter M3, board transport mechanism 7, component mounting mechanism (Y-axis beam 10, X-axis beams 11, and mounting heads 12), component recognition cameras 13, and board recognition cameras 14 configure component mounting work unit 18 (refer to FIG. 5) which transports board B and mounts components D which are supplied by component suppliers 8 onto board B which is transported.

Next, a description will be given of the configuration of the control system of component mounting system 1 with reference to FIG. 5. Component mounting lines L1 to L3 with which component mounting system 1 is provided have the same configuration and hereinafter, a description will be given relating to component mounting line L1. Component mounters M3 to M6 with which component mounting line L1 is provided have the same configuration, and hereinafter, a description will be given of component mounter M3.

Figure 5:
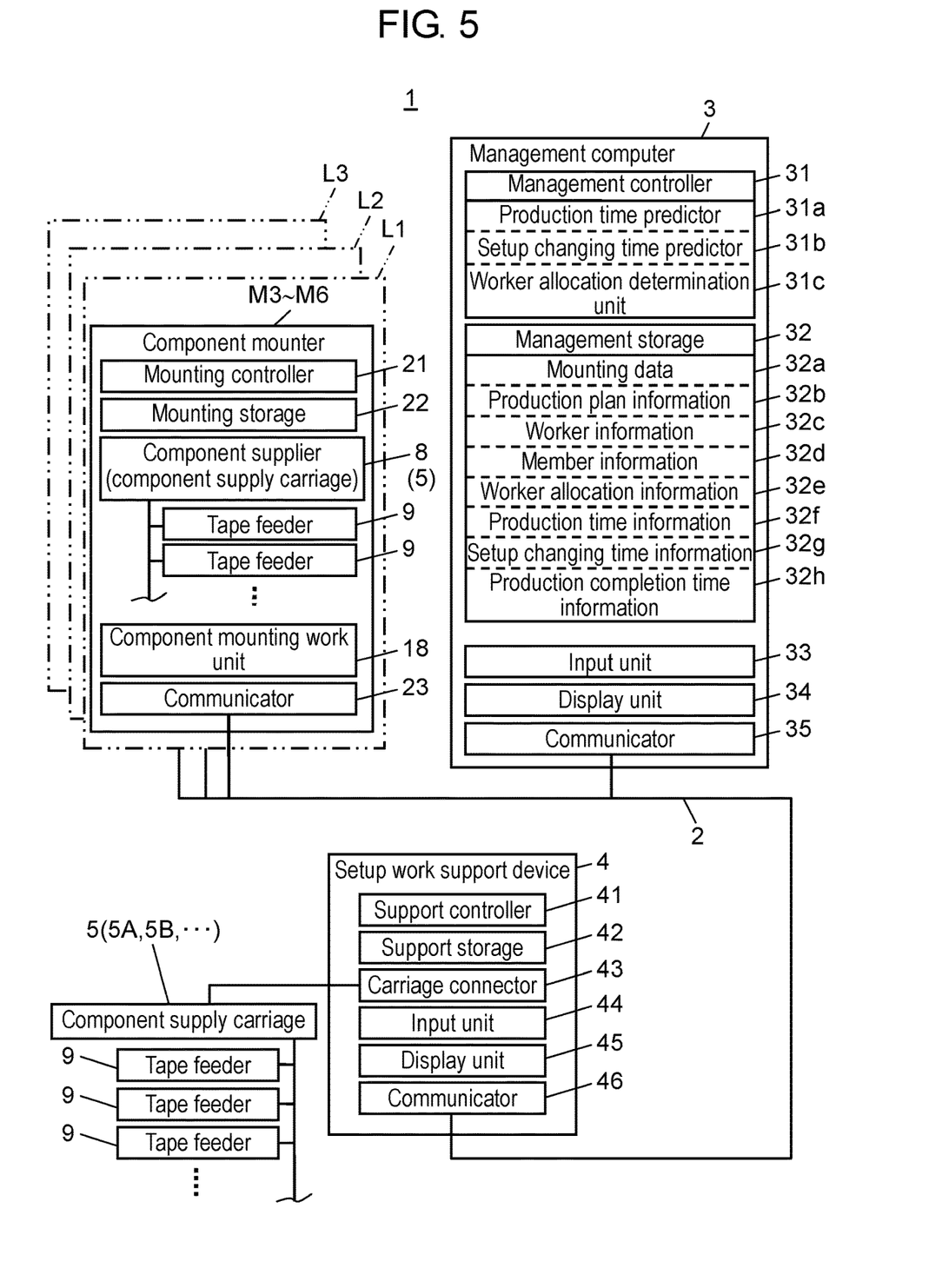
FIG. 5 is a block diagram illustrating the configuration of a control system of the component mounting system of an embodiment of the present disclosure.

In FIG. 5, component mounter M3 is provided with mounting controller 21, mounting storage 22, component suppliers 8, component mounting work unit 18, and communicator 23. Communicator 23 is a communication interface and performs the transaction of signals and data between other component mounters M4 to M6, other component mounting lines L2 and L3, and management computer 3 via communication network 2. Mounting controller 21 controls tape feeders 9 which are installed on component suppliers 8 and component mounting work unit 18 based on the component mounting data which is stored by mounting storage 22 to cause component mounter M3 to perform the component mounting work.

In FIG. 5, management computer 3 is provided with management controller 31, management storage 32, input unit 33, display unit 34, and communicator 35. Input unit 33 is an input device such as a keyboard, a touch panel, a mouse, or the like and is used for operation commands, during data input, and the like. Display unit 34 is a display device such as a liquid crystal panel and displays various information such as an operation screen for the operations which are carried out using input unit 33. Communicator 35 is a communication interface and performs the transaction of signals and data between component mounters M3 to M6 of component mounting lines L1 to L3 and setup work support device 4 via communication network 2.

Management controller 31 is a computation device such as a CPU and manages component mounting system 1 based on information which is stored by management storage 32. Management controller 31 is provided with production time predictor 31a, setup changing time predictor 31b, and worker allocation determination unit 31c as internal processing functions. Management storage 32 is a storage device and stores mounting data 32a, production plan information 32b, worker information 32c, member information 32d, worker allocation information 32e, production time information 32f, setup changing time information 32g, production completion time information 32h, and the like.

In FIG. 5, mounting data 32a is data such as the component type of components D to be mounted and the mounting points on board B and is stored for each production-target board type. A production plan which is planned in a predetermined period (for example, one day) in component mounting system 1 and which includes the type, the number, and the like of the mounting boards to be produced in component mounting lines L1 to L3 is stored in production plan information 32b. Information which specifies the workers that can be allocated to various types of work such as the setup work and the component replenishing work and the workable time which arise in component mounting system 1 in a predetermined period (for example, one day) are stored in worker information 32c.

Component supply carriages 5 which are installed on each component mounter M3 to M6, installation positions of tape feeders 9, remaining number of components D of each tape feeder 9, suction nozzles 12b which are installed, remaining amount of solder and the like to be supplied by solder printer M1, and information of members which are used in current component mounting work are transmitted by component mounting lines L1 to L3 and stored in member information 32d. Information of component supply carriages 5 for exchanging, tape feeders 9, supply reels 17 which store components D, suction nozzles 12b, bottom receiving pin holding plate 7a, bottom receiving pins 7b, masks, solder for replenishing and the like, external setup area Ap which is used in the next component mounting work onward, and members which are stored in a member warehouse or the like is stored in member information 32d.

Worker allocation information 32e is information in which workers responsible for specific work are allocated to the work which arises in component mounting lines L1 to L3. Worker allocation information 32e is determined by worker allocation determination unit 31c which is described below.

In FIG. 5, production time predictor 31a predicts the arising time and the work amount (the work time) of work (component replenishing work and the like) which arises in component mounting lines L1 to L3 to calculate (predict) production time Tp which is necessary for producing the planned number of mounting boards for each mounting board based on mounting data 32a, production plan information 32b, member information 32d, and worker allocation information 32e. Production time Tp which is calculated is stored in management storage 32 as production time information 32f.

Setup changing time predictor 31b predicts the work amount (the work time) of the setup work which arises in the setup changing to calculate (predict) setup changing time Tc which is necessary for the setup changing for each setup change based on mounting data 32a, production plan information 32b, member information 32d, and worker allocation information 32e. Setup changing time Tc which is calculated is stored in management storage 32 as setup changing time information 32g.

In cooperation with production time predictor 31a and setup changing time predictor 31b, worker allocation determination unit 31c calculates the production completion time Tf of each component mounting line L1 to L3 based on production plan information 32b, worker information 32c, production time information 32f, and setup changing time information 32g. Worker allocation determination unit 31c determines the allocation of the workers responsible for specific work to the work which arises in each of component mounting lines L1 to L3 such that production completion time Tf of each of component mounting lines L1 to L3 becomes sooner.

In other words, in the production of predetermined mounting boards, worker allocation determination unit 31c determines the allocation of the workers to work which arises in each of the plurality of component mounting lines L1 to L3 such that production completion time Tf of each of the plurality of component mounting lines L1 to L3 becomes sooner. Production completion time Tf which is calculated is stored in management storage 32 as production completion time information 32h and the determined allocation of the workers is stored in management storage 32 as worker allocation information 32e.

Here, a description will be given of the details of the worker allocation process in which worker allocation determination unit 31c cooperates with production time predictor 31a and setup changing time predictor 31b to determine the allocation of the workers with reference to FIG. 6. Here, a description will be given of a procedure of the worker allocation process using a simple example in which three workers OP1, OP2, and OP3 produce mounting boards in parallel in two component mounting lines L1 and L2.

In this example, it is assumed that component mounting line L1 and component mounting line L2 start the production of mounting boards at the same time. It is assumed that component mounting line L1 produces two mounting boards B11 and B12 in order and that component mounting line L2 produces two mounting boards B21 and B22 in order. It is assumed that setup changing is necessary both when the production is switched from mounting board B11 to mounting board B12 and when the production is switched from mounting board B21 to mounting board B22.

Figure 6:
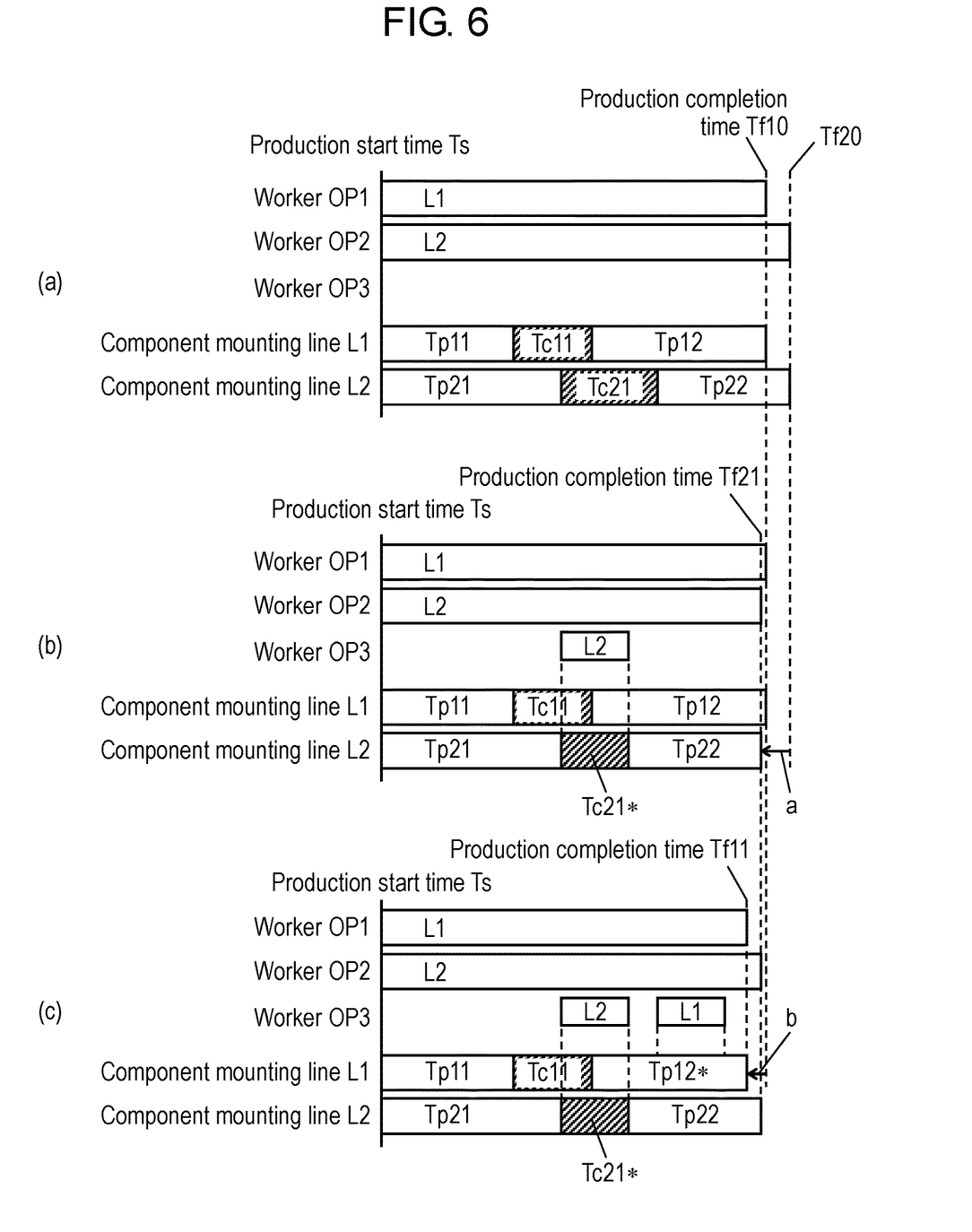
FIG. 6 is a process explanatory diagram of worker allocation in the component mounting system of an embodiment of the present disclosure.

In (a) of FIG. 6, first, worker allocation determination unit 31c allocates worker OP1 to component mounting line L1 and worker OP2 to component mounting line L2 and stores the allocation as worker allocation information 32e. Under these conditions, production time predictor 31a calculates production time Tp11 of mounting board B11 and production time Tp12 of mounting board B12 in component mounting line L1 and production time Tp21 of mounting board B21 and production time Tp22 of mounting board B22 in component mounting line L2 and stores the production times as production time information 32f.

Setup changing time predictor 31b calculates setup changing time Tc11 from mounting board B11 to mounting board B12 in component mounting line L1 and setup changing time Tc21 from mounting board B21 to mounting board B22 in component mounting line L2 and stores the setup changing times as setup changing time information 32g.

Using these calculated results, worker allocation determination unit 31c calculates a time at which production time Tp11, setup changing time Tc11, and production time Tp12 are elapsed from production start time Ts as production completion time Tf10 of component mounting line L1 and stores production completion time Tf10 as production completion time information 32h. Similarly, worker allocation determination unit 31c calculates a time at which production time Tp21, setup changing time Tc21, and production time Tp22 are elapsed from production start time Ts as production completion time Tf20 of component mounting line L2 and stores production completion time Tf20 as production completion time information 32h.

In this example, production completion time Tf20 of component mounting line L2 is later than production completion time Tf10 of component mounting line L1. Therefore, production completion time Tf of component mounting system 1 in worker allocation information 32e is predicted to be production completion time Tf20 of component mounting line L2, which is later.

In (b) of FIG. 6, next, worker allocation determination unit 31c adds worker OP3 who has a vacancy in the working time and allocates worker OP3 to the work of component mounting line L2 for which production completion time Tf is late. In other words, after allocating each of worker OP1 and worker OP2 to the work which arises in each of the plurality of component mounting lines L1 and L2, worker allocation determination unit 31c allocates another one of the workers OP3 who can be allocated to one of the items of work of component mounting line L2 for which production completion time Tf is predicted to be the latest. Accordingly, it is possible to efficiently allocate the workers.

For example, in a case in which replenishing work of components D in the plurality of component mounters M3 to M6 and exchanging work of tape feeders 9 arise at the same time and the component mounting work in component mounters M3 to M6 stops with only the single worker OP2, by adding worker OP3, it is possible to continue the component mounting work or to shorten the stopping time. When worker OP3 is allocated to the work of component mounting line L2, the effect of production time Tp or setup changing time Tc being shortened is greatest, and as a result, worker allocation determination unit 31c allocates the working time of worker OP3 to the work for which production completion time Tf is soonest.

In this example, it is supposed that the effect of time shortening is great in setup changing time Tc from mounting board B21 to mounting board B22 and worker allocation determination unit 31c allocates worker OP3 to this work and updates worker allocation information 32e. Next, setup changing time predictor 31b recalculates setup changing time Tc21*(Tc21*<Tc21) from mounting board B21 to mounting board B22 and updates setup changing time information 32g. Next, worker allocation determination unit 31c calculates a time at which production time Tp21, setup changing time Tc21*, and production time Tp22 are elapsed from production start time Ts as production completion time Tf21 of component mounting line L2 and updates production completion time information 32h.

In (b) of FIG. 6, through the addition of worker OP3, production completion time Tf21 of component mounting line L2 becomes sooner than the original production completion time Tf20 (arrow a), and, as a result, becomes sooner than production completion time Tf10 of component mounting line L1. Therefore, it is supposed that production completion time Tf of component mounting system 1 in worker allocation information 32e will be production completion time Tf10 of component mounting line L1, which is later. In this manner, worker allocation determination unit 31c allocates another one of the workers OP3 who can be allocated to the work for which production completion time Tf of component mounting line L2 is predicted to be the soonest among the items of the work of component mounting line L2 for which production completion time Tf10 is predicted to be the latest. Accordingly, it is possible to efficiently produce the mounting boards.

In (c) of FIG. 6, next, in the same manner as in (b) of FIG. 6, worker allocation determination unit 31c allocates worker OP3 who still has a vacancy in the working time to a portion of the work of mounting board B12 for which the greatest time shortening effect can be anticipated among the items of the work of component mounting line L1 for which production completion time Tf10 is late and updates worker allocation information 32e. Accordingly, production time Tp12 of mounting board B12 is shortened to production time Tp12*(Tp12*<Tp12), it is supposed that production completion time Tf11 of component mounting line L1 will be sooner than the original production completion time Tf10 (arrow b) and it is predicted to be sooner than production completion time Tf21 of component mounting line L2.

Hereinafter, worker allocation determination unit 31c repeats the worker allocation process until vacancies in the working time of all workers OP1, OP2, and OP3 are depleted to determine the worker allocation information and updates worker allocation information 32e. Worker allocation information 32e at the point in time at which the allocation of the working time of all of the workers is completed becomes the allocation of workers which is obtained by the worker allocation process.

In FIG. 5, setup work support device 4 is provided with support controller 41, support storage 42, carriage connector 43, input unit 44, display unit 45, and communicator 46. Input unit 44 is an input device such as a keyboard, a touch panel, a mouse, or the like and is used for operation commands, during data input, and the like. Display unit 45 is a display device such as a liquid crystal panel and displays various information such as an operation screen for the operations which are carried out using input unit 44 in addition to various information such as the procedure of the setup work and the progress status of the setup work.

Communicator 46 is a communication interface and performs the transaction of signals and data between setup work support device 4 and management computer 3 via communication network 2. Support controller 41 is a computation device such as a CPU and controls setup work support device 4 based on the information which is stored by support storage 42. Support storage 42 is a storage device and stores the setup work procedure and the like. Component supply carriages 5 for exchanging (component supply carriages 5A, 5B, and the like of FIG. 1) are connected to carriage connector 43. Carriage connector 43 communicates with a feeder controller which is embedded in each tape feeder 9 which is installed in component supply carriage 5 via component supply carriage 5.

Next, a description will be given of the worker allocation method (the worker allocation process) which determines the allocation of the workers, following the flow of FIG. 7. Worker allocation determination unit 31c allocates the workers one at a time to each component mounting line L1 to L3 based on worker information 32c and stores the allocations as worker allocation information 32e (ST1: initial worker allocation step).

Next, production time predictor 31a calculates production time Tp of mounting boards for which production is planned in production plan information 32b and stores production time Tp as production time information 32f, setup changing time predictor 31b calculates setup changing time Tc and stores setup changing time Tc as setup changing time information 32g, and worker allocation determination unit 31c calculates production completion time Tf and stores production completion time Tf as production completion time information 32h (ST2: initial calculation step).

Next, worker allocation determination unit 31c determines whether or not workers for which work can be added remain based on worker allocation information 32e and worker information 32c which are stored (ST3: remaining worker determination step). In a case in which workers for which work can be added do not remain (No in ST3), worker allocation determination unit 31c ends the worker allocation process. In a case in which workers for which work can be added do remain (Yes in ST3), worker allocation determination unit 31c selects component mounting line L1 to L3 in which production completion time Tf is latest (ST4: line selection step).

Next, worker allocation determination unit 31c adds and allocates a worker to the work in which production time Tp or setup changing time Tc may be shortened most among the items of the work of selected component mounting line L1 to L3 and updates worker allocation information 32e (ST5 additional worker allocation step).

Figure 7:
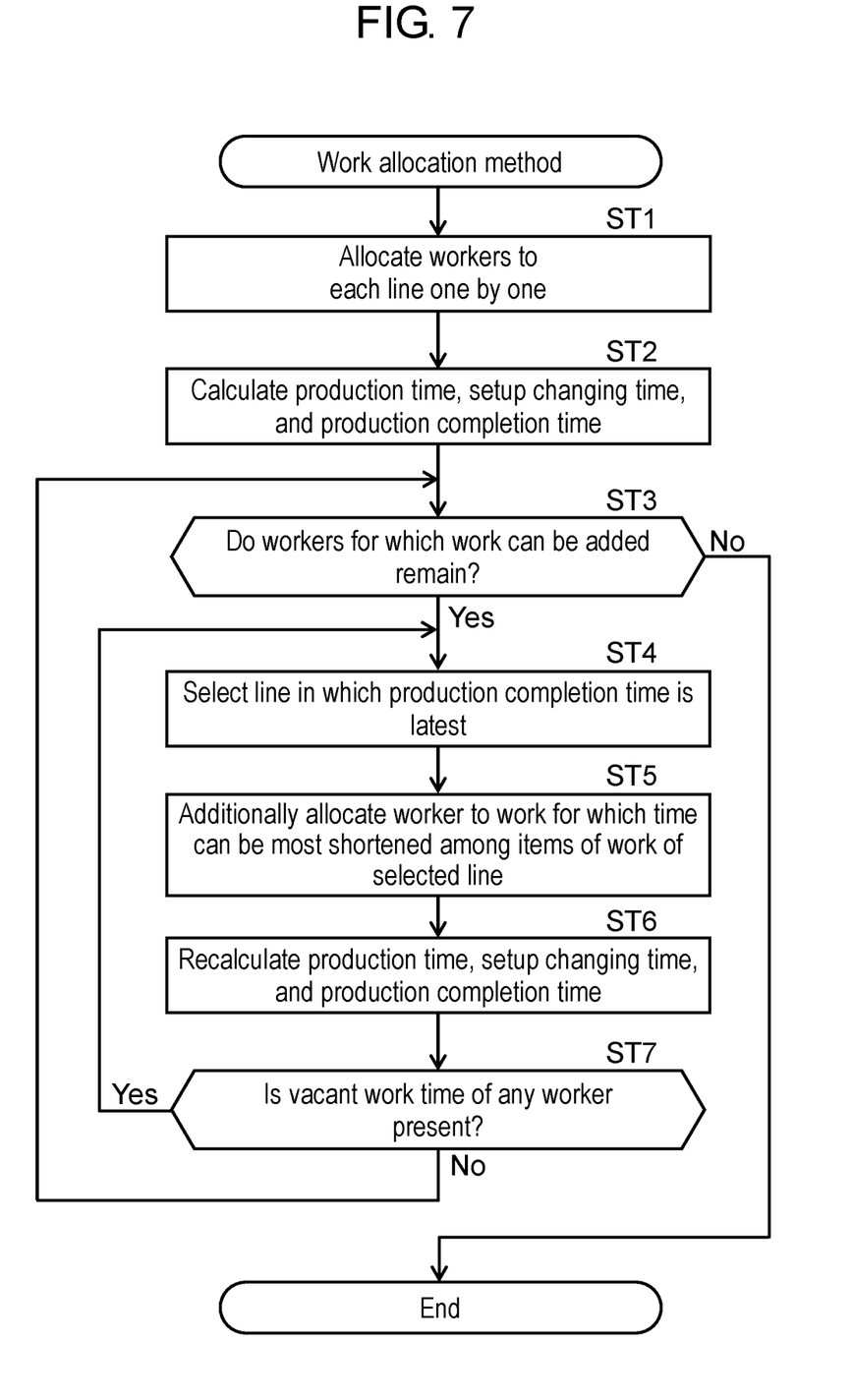
FIG. 7 is a flowchart of a worker allocation method in the component mounting system of an embodiment of the present disclosure.

In FIG. 7, next, based on worker allocation information 32e which is updated, production time predictor 31a recalculates and updates production time Tp as production time information 32f, setup changing time predictor 31b recalculates setup changing time Tc and updates setup changing time information 32g, and worker allocation determination unit 31c recalculates production completion time Tf and updates production completion time information 32h (ST6: recalculation step).

Next, worker allocation determination unit 31c determines whether or not there is a vacancy in the working time of any of the workers (regardless of whether the workers are initial workers or added workers) (ST7: remaining vacancy time determination step). In a case in which there is vacant time (Yes in ST7), the process returns to the line selection step (ST4) and allocates the work to the vacant working time of the relevant worker (ST5). In a case in which there is no vacant time (No in ST7), the process returns to the remaining worker determination step (ST3) and allocates the work to a different worker who can be added (ST5).

In this manner, worker allocation determination unit 31c allocates the work to all of the workers and worker allocation information 32e is determined. In other words, in the production of predetermined mounting boards, the initial worker allocation step (ST1) and the additional worker allocation step (ST5) are worker allocation steps which determine the allocation of the workers to work which arises in each of the plurality of component mounting lines L1 to L3 such that production completion time Tf of each of the plurality of component mounting lines L1 to L3 becomes sooner. Accordingly, it is possible to determine the allocation of the workers such that it is possible to efficiently produce the mounting boards in the plurality of component mounting lines L1 to L3.

In the worker allocation steps, among the items of the work of component mounting line L1 to L3 which is predicted to have the latest production completion time Tf, another one of the workers who can be allocated is allocated to the work with which production completion time Tf of component mounting line L1 to L3 is predicted to become soonest (ST5). Accordingly, it is possible to efficiently produce the mounting boards. In the worker allocation step, after allocating each worker one at a time to the work which arises in each of the plurality of component mounting lines L1 to L3 (ST1), another one of the workers who can be allocated is allocated to one of the items of work of component mounting lines L1 to L3 for which production completion time Tf is predicted to be the latest (ST5). Accordingly, it is possible to efficiently allocate the workers.

The allocation of the workers which is determined in the worker allocation step is stored in management storage 32 as worker allocation information in the storage step.

As described hereinabove, component mounting system 1 of the present embodiment includes a plurality of component mounting lines L1 to L3 and is provided with worker allocation determination unit 31c which determines an allocation of workers to work which arises in each of the plurality of component mounting lines L1 to L3 such that production completion times Tf of the plurality of component mounting lines L1 to L3 become sooner when producing predetermined mounting boards, and a management storage which stores the allocation of workers which is determined by worker allocation determination unit 31c. Management computer 3 which is provided with worker allocation determination unit 31c serves as the worker allocation system. Accordingly, it is possible to determine the allocation of the workers such that it is possible to efficiently produce the mounting boards in the plurality of component mounting lines L1 to L3.

The worker allocation system is not limited to management computer 3 which is connected to component mounting lines L1 to L3 and communication network 2. Worker allocation system may be a computer which is provided with worker allocation determination unit 31c and may not be connected to component mounting lines L1 to L3.

In the description of the embodiment, in the initial worker allocation step (ST1), the workers are allocated one at a time; however, the method of initially allocating the workers is not limited thereto. For example, with regard to the work which is determined to require at least two workers, two workers may be allocated in the initial worker allocation step (ST1). In other words, in the initial worker allocation step (ST1), a configuration may be adopted in which a minimum necessary number of workers (at least one) are allocated.

The component mounting system, the worker allocation system, and the worker allocation method have the effect of being capable of determining the allocation of the workers such that it is possible to efficiently produce mounting boards in the plurality of component mounting lines and are useful in the field of component mounting in which components are mounted on boards.

What is claimed is:

1. A worker allocation method comprising:
   determining an allocation of a plurality of workers to work in each of a plurality of component mounting lines;
   calculating a production completion time for each of the plurality of component mounting lines;
   selecting a component mounting line of the plurality of component mounting lines in which the calculated production completion time is latest;
   allocating an available worker of the plurality of workers to the selected component mounting line;
   recalculating the production completion time for each of the plurality of component mounting lines;
   repeating the selecting, allocating, and recalculating steps until no worker of the plurality of workers is available for allocation;
   storing the determined allocation of workers; and
   producing mounting boards in the plurality of component mounting lines by the plurality of workers performing at least one of a setup work and a production work according to the stored determined allocation of workers.

2. The worker allocation method of claim 1, further comprising:
 determining one worker of the plurality of workers who is allocated to work in a component mounting line of the plurality of component mounting lines for which the calculated production completion time is soonest; and
 allocating the worker to work in the component mounting line for which the calculated production completion time is latest.

3. The worker allocation method of claim 1, wherein calculating a production completion time is based on worker information, production time information, and setup changing time information.

* * * * *